United States Patent
Cacciola et al.

(10) Patent No.: US 9,366,560 B2
(45) Date of Patent: Jun. 14, 2016

(54) DETECTOR FOR DETECTING A CHANGE IN A FLUID LEVEL AND GENERATING A DIGITAL SIGNAL

(71) Applicants: John Cacciola, Severna Park, MD (US); Clark F. Johnson, Chestertown, MD (US); Allen Sullender, Sparks, MD (US)

(72) Inventors: John Cacciola, Severna Park, MD (US); Clark F. Johnson, Chestertown, MD (US); Allen Sullender, Sparks, MD (US)

( * ) Notice: Subject to any disclaimer, the term of this patent is extended or adjusted under 35 U.S.C. 154(b) by 412 days.

(21) Appl. No.: 13/957,172

(22) Filed: Aug. 1, 2013

(65) Prior Publication Data

US 2015/0033845 A1    Feb. 5, 2015

(51) Int. Cl.
    *G01F 23/292*    (2006.01)
(52) U.S. Cl.
    CPC .......... *G01F 23/2921* (2013.01); *G01F 23/292* (2013.01); *G01F 23/2928* (2013.01)
(58) Field of Classification Search
    CPC   G01F 23/292; G01F 23/2928; G01F 23/2921
    USPC .............................. 73/290 R, 293; 702/55, 54
    See application file for complete search history.

(56) References Cited

U.S. PATENT DOCUMENTS

| | | | |
|---|---|---|---|
| 2,437,935 A | 3/1948 | Brunner et al. | |
| 3,908,129 A | 9/1975 | Akers | |
| 3,935,876 A * | 2/1976 | Massie ................ | A61M 1/3626 |
| | | | 128/DIG. 13 |
| 4,803,592 A | 2/1989 | Ashley | |
| 4,840,137 A * | 6/1989 | Beauvais ............ | G01F 23/2925 |
| | | | 116/227 |
| 4,857,894 A * | 8/1989 | Dahl .................... | G08B 21/182 |
| | | | 250/577 |
| 4,878,421 A | 11/1989 | Glasser | |
| 4,905,579 A | 3/1990 | Dame | |
| 4,920,263 A * | 4/1990 | Fimian .................... | G01T 1/003 |
| | | | 250/253 |
| 4,941,153 A | 7/1990 | Kelley et al. | |
| 4,983,352 A | 1/1991 | Efferding | |
| 5,277,003 A | 1/1994 | Myers | |
| 5,288,268 A | 2/1994 | Kuypers | |
| 5,388,444 A | 2/1995 | Gerard | |
| 5,437,180 A | 8/1995 | Sowinski | |

(Continued)

FOREIGN PATENT DOCUMENTS

| EP | 0885341 B1 | 6/2000 |
|---|---|---|
| EP | 1014427 A2 | 6/2000 |

(Continued)

OTHER PUBLICATIONS

PCT Search Report and Written Opinion for PCT/US14/48536, mailed Mar. 27, 2015 (13 pages).

(Continued)

*Primary Examiner* — Hezron E Williams
*Assistant Examiner* — Marrit Eyassu
(74) *Attorney, Agent, or Firm* — Joseph E. Maenner; Petock & Petock, LLC

(57) ABSTRACT

A detector for detecting a change in a fluid level and generating a digital signal uses a light source and a photodetector mounted diametrically on a tube in a predetermined location where a change in fluid level is to be detected. The circuit provides two stable output states or levels, one which corresponds to fluid not being in the tube between the light source such as an LED light and the photodetector and the other level when fluid is in the tube. In a particular application, the invention is utilized to monitor fluid level in a predetermined location of a manometer to shut off a radon remedial system and provide audio/and or visual alarms when there is a fluid level change which indicates that the radon remedial system is not operating effectively.

18 Claims, 3 Drawing Sheets

(56) References Cited

U.S. PATENT DOCUMENTS

| | | | |
|---|---|---|---|
| 5,576,493 A | 11/1996 | Sowinski | |
| 5,742,516 A | 4/1998 | Olcerst | |
| 5,883,378 A | 3/1999 | Irish et al. | |
| 6,098,448 A | 8/2000 | Lowry et al. | |
| 6,711,470 B1 | 3/2004 | Hartenstein et al. | |
| 7,302,313 B2 | 11/2007 | Sharp et al. | |
| 7,389,158 B2 | 6/2008 | Desrochers et al. | |
| 7,513,151 B2 * | 4/2009 | D'Angelico | G01F 23/2966 73/290 R |
| 2005/0173107 A1 * | 8/2005 | Heilmann | B01F 3/04262 166/68 |
| 2009/0230305 A1 * | 9/2009 | Burke | G01T 1/178 250/336.1 |
| 2011/0283641 A1 | 11/2011 | Aubut | |
| 2012/0218112 A1 | 8/2012 | Kresge | |
| 2012/0227336 A1 | 9/2012 | Trebil | |
| 2012/0245878 A1 | 9/2012 | Kane et al. | |
| 2012/0285262 A1 | 11/2012 | Kelley | |

FOREIGN PATENT DOCUMENTS

| | | |
|---|---|---|
| EP | 1126508 A2 | 8/2001 |
| EP | 2292848 A1 | 3/2011 |
| EP | 2569541 | 3/2013 |

OTHER PUBLICATIONS

International Preliminary Report on Patentability, PCT/US2014/048536, mailed Feb. 2, 2016. 5 pages.

* cited by examiner

DETECTOR FOR DETECTING A CHANGE IN A FLUID LEVEL AND GENERATING A DIGITAL SIGNAL

FIELD OF THE INVENTION

The present invention relates to a detector for detecting a change in a fluid level in a tube. More particularly, the present invention relates to generating a switching signal in response to a change in level of a fluid in a tube, particularly to a change in a fluid level in a manometer monitoring the pressure in a radon remedial system.

BACKGROUND OF THE INVENTION

Radon which is a radioactive gas is a significant problem in many places of this country and of the world. It has been said that radon is the number two cause of cancer in the United States.

In many areas prone to radon seeping out of the earth, radon remedial systems have been installed in homes and other buildings wherein radon gas is sucked into a duct work and expelled from the home or building. This helps lower the radon level in the home or building. However, the Environmental Protection Agency has taken the position that a malfunctioning radon remedial system would be better turned off than left running.

SUMMARY OF THE INVENTION

In accordance with the present invention, radon remedial systems may be automatically monitored and an alarm provided to the homeowner or other person in charge that the system is malfunctioning and/or may automatically turn the radon remedial system off. This is particularly important as radon remedial systems are typically located in basements, crawl spaces and other areas of the home or building which are inconvenient and sometimes undesirable to enter to check on the status of operation of the radon remedial system.

A manometer, which measures a difference in pressure and/or degree of vacuum of a volume by a change in the fluid level on one side of a U tube of the manometer, may be used to determine the degree of effectiveness of the radon remedial system. However, such a manometer would be difficult to access in many cases, particularly in basements and in crawl spaces under building living areas. A change in the fluid level in the manometer indicates a change in the degree of vacuum or suction created by a fan which is pulling air out of the basement area or other treated area which contains radon.

In accordance with the present invention, this change may be detected and a signal in the form of a digital switching signal or a significant change in voltage level or change from one state to a second state may be generated.

In accordance with the present invention, the detector of the present invention may be utilized in other monitoring systems including exhaust systems of other dangerous gases.

Briefly and basically in accordance with the present invention, a detector for detecting a change in fluid level in a tube is provided. The tube is constructed of a material that at least partially transmits light. A light is mounted on one side of the tube and a photodetector mounted on an opposite side of the tube. The light and photodetector are mounted at a first predetermined location along the tube. This location is typically the area where the fluid would rise upon failure of the remedial system. The photodetector provides an output voltage when the light is energized. A digital signal forming circuit receives the output of the photodetector and produces an output which changes from one state or level to a second state or level when the output of the photodetector reaches a predetermined voltage. The rate of change of the voltage difference between the first and second states is significantly faster than the voltage variation or rate of change of the output of the photodetector. The digital signal forming circuit includes supply voltages and components biasing at least one solid state device, such as an integrated circuit or transistor to switch at the predetermined voltage, which predetermined voltage is within a range of output voltages of the photodetector. The voltage difference between the first and second states or levels is significantly different from the voltage variation in the output of the photodetector. A driver circuit is provided which has a low impedance output suitable for matching the impedance of a line to a remote location. The driver receives the output of the signal from the signal forming circuit and provides a signal at low impedance for transmission to the remote location to indicate whether the fluid in the tube is above or below a predetermined location.

Any suitable light may be utilized as a light source for photodetection of whether fluid has risen or dropped in the tubing. However, in a presently preferred embodiment, a light emitting diode (LED) is being used. However, other (LED's) are being considered including yellow light producing LED's. In general, the LED may have a wavelength range of from 350 to 750 nanometers.

The wavelength frequencies to which the photodetector are sensitive are preferably in the same range. The photodetector must be responsive to the light which travels from the light source through the tube and the fluid within the tube to the photodetector. The present invention may find use in applications other than radon detection systems, that is anywhere a fluid level in a tube needs to be monitored.

In a presently preferred embodiment, the tube is the U tube of a manometer, and particularly a manometer used in a radon remedial system.

In a presently preferred embodiment, the present invention produces a digital switching signal which changes from one condition to another to both turn off the remedial system and generate an audio visual alarm that the radon remedial system is not operating effectively.

In summary, the invention comprises a detector system for detecting a change in the manometer fluid level which can reflect a change in pressure or degree of vacuum sensed by the manometer level in turn reflecting a fault in the operation of the radon remedial system. The detection of the change in manometer pressure by use of the detection circuit generates a signal which may be used to indicate that the system is not functioning properly and/or may be used to automatically shut the radon remedial system down when it is not operating properly as the EPA contends that more radon may be drawn into the basement or other area being treated when the radon remedial system is not operating properly. Essentially, a light emitting diode (LED) is positioned on one side of the manometer tube and a photodetector on the other side. Preferably an NPN phototransistor may be used as the photodetector. The placement of the LED and the phototransistor are shown on FIG. 1. The signal is generated as a result of the detection of the change of the manometer liquid level. The manometer liquid is preferably a light oil, but other liquids may be used, including mercury. When the system is off, the manometer fluid reduces the light from the LED to the phototransistor. A timing delay circuit is used to allow sufficient time for start up, this may be a time constant circuit or other suitable time delay circuit. When the system is up and operating, the manometer fluid is drawn down such that light passes through the manometer tube to the phototransistor. If a loss of vacuum occurs in the system, the manometer fluid will rise, reducing the light and generating a signal which results in the radon system being shut down and/or generating an audible and/or visual alarm at a selected location which may be and usually is distant from the location of the manometer. In other words by way of examples and not by way of limitation, the manometer and the radon system are typically located in the basement or crawl space or other inconvenient location, and with the use of the present invention, a signal may be sent to living quarters generating an audible alarm and/or a visual alarm such as a blinking red light or the like. This in a preferred embodiment would be in addition to shutting down the system when the partial vacuum being generated by the fan is compromised.

In summary, the present invention provides an unambiguous electrical digital signal as a function of the presence or absence of a liquid in a predetermined LED/photodetector location of the tube. The present invention provides a detector with a definite defined switching output provided by a digital signal. The quasi-linear output level from the photodetector does not provide a definite switch point. The present invention provides a digital switching circuit which can be adjusted to switch at the desired and proper point in the transition of the fluid level from below the predetermined location of the LED and photodetector to above it. This change in fluid level does not produce a complete loss of light when the fluid level rises, but results in a translucent material being placed between the light emitting diode and the photodetector which results in a change in the output of the photodetector in a quasi-linear manner, which is not suitable for driving a definite safety shut off of a radon remedial system and/or the providing of a definite point for audio and/or visual alarms. The logic levels of the present invention in the form of a digital signal are achieved from the analog voltage by driving a triggered NAND gate with positive feedback in the feedback loop of the solid state semiconductor device such that once the selected voltage, within the range of the output voltages of the photodetector is reached, the detector of the present invention provides a rapid change of the voltage output level from one state to a second state. The trigger point of this circuit may be adjusted to different voltage levels by selecting the supply and biasing voltages and biasing components such as resistors. The trigger voltage point of the solid state device in the digital signal forming circuit is selected to be within the range of the output voltages of the photodetector when transitioning from a fluid level below the photodetector to a fluid level above the photodetector. These levels may be used to drive a common emitter PNP transistor which lowers the output impedance so that the output signal may be fed to long cable runs to drive emergency shut off circuitry and/or audible and/or visual alarms.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
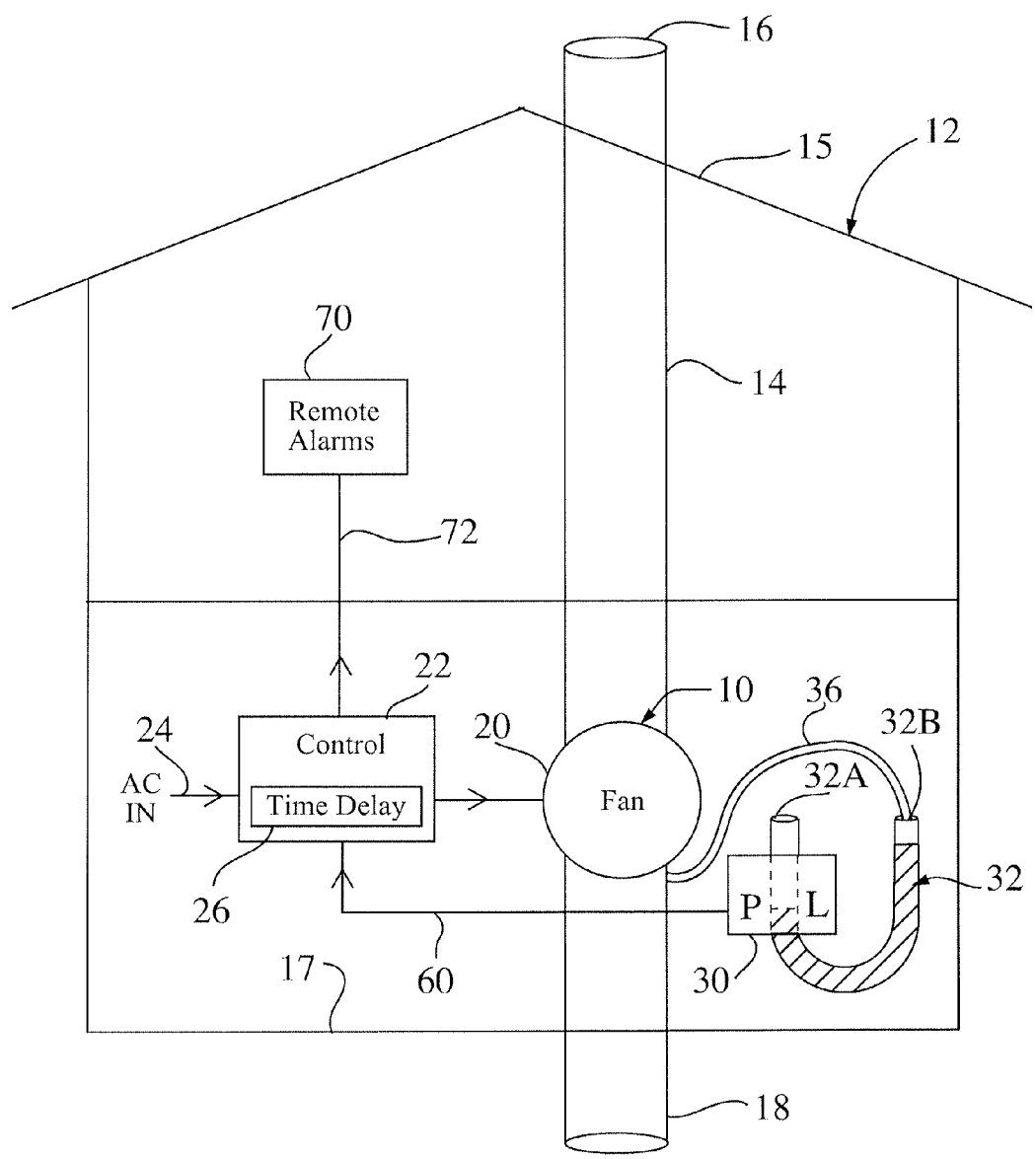
FIG. 1 is an elevation schematic view of a radon remedial system utilizing the detector of the present invention.

Referring now to the drawings, wherein like numerals indicate like elements, there is shown in FIG. 1 a radon remedial system 10 in a house 12. The radon remedial system 10 is comprised of duct work 14 which may be any suitable duct work including PVC piping. The duct work 14 extends at 16 above the roof line 15 to below basement floor 17 at 18. Air containing radon is sucked or drawn into the lower portion 18 of duct work 14 by fan 20 and expelled out of the upper portion of the duct at 16, above the roof line 15. The operation of fan 20 is controlled in control unit 22 which applies to AC power from 24 (indicated as AC IN) to fan 20.

Figure 2:
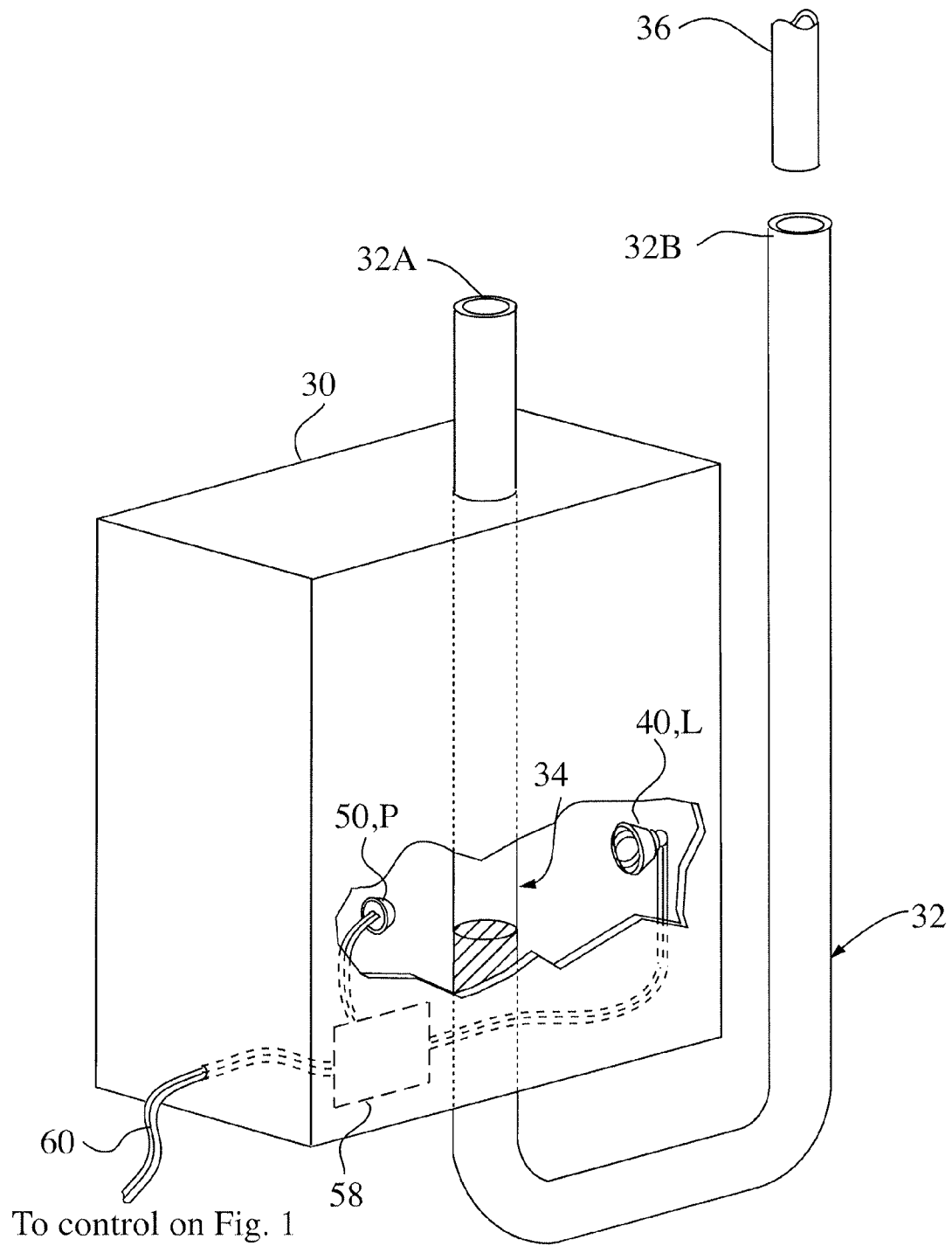
FIG. 2 is an elevation view, partially broken away of a detector in accordance with the present invention mounted in a box on one leg of a manometer tube.
Figure 3:
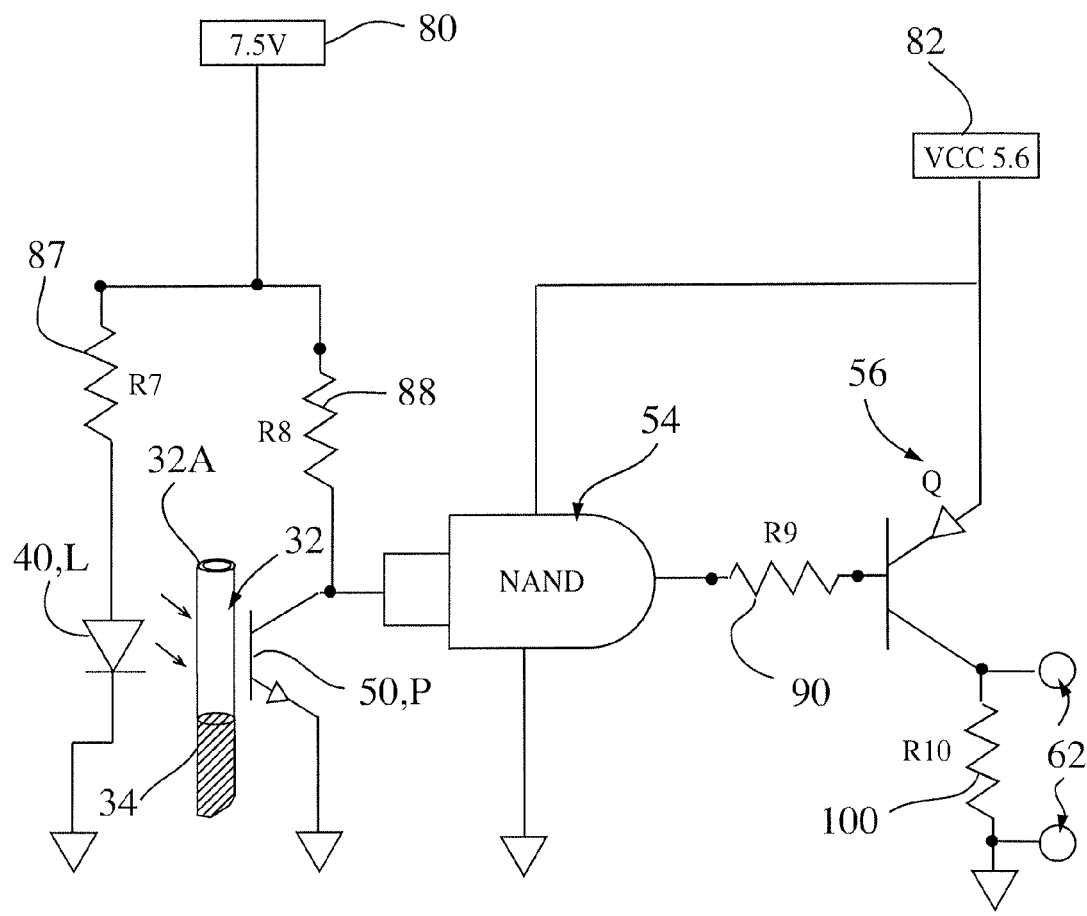
FIG. 3 is a schematic diagram of a detector circuit in accordance with the present invention.

Continuing to refer to FIG. 1 and to FIG. 2, detector 30 is mounted at a predetermined location 34 along tube 32. Predetermined location 34 along tube 32 as indicated in FIGS. 1, 2 and 3 would be just above the fluid level in the manometer when the radon remedial or removal system is operating properly in full normal capacity or effectiveness. This is indicated as location area 34 in FIGS. 1, 2 and 3.

As will be described more fully below, the system of the present invention may be utilized to provide automatic emergency shut off and/or audio and/or visual alarms in various ways by merely rearranging some of the components. For example, the change in fluid level may be at a location in the tube where the fluid level falls instead of rising upon failure of the radon remedial system. This is intended to be fully covered as a part of the present invention. In other words by, placing or inserting duct work remedial pressure sensing tube 36 above the fan, a positive pressure would be sensed and upon failure of the radon remedial system the fluid level on the left side of the U tube 32 would drop, instead of rising, and the present invention may be utilized to detect and provide reliable, accurate and timely indication of the need to shut off the system or actually shut off the system and alert the residents of the building.

Explaining more fully, manometers utilize a U shaped tube open at both ends, one end typically being in open communication with the atmosphere and the other end being in communication with a gas or air pressure to be measured or monitored which may vary somewhat from the air pressure in the atmosphere or other reference gas pressure. The pressure of the gas or air to be monitored may be positive or negative. That is, it may be above or below the pressure of the reference air pressure, which is typically atmospheric pressure. Accordingly, depending upon how the radon remedial system and detector are arranged, it is understood that the predetermined location may be at different places along the U tube depending upon the arrangement. In other words, if the detector of the present invention were mounted on the other leg of the U tube, the predetermined location would be such that the fluid level would drop, instead of rise if there were a malfunction of the fan or other component in the remedial system. The present invention may be arranged in various modalities of detecting a rise or drop in the fluid pressure in a particular leg of the manometer or other tube depending upon the arrangement including, as mentioned above, the location of the point of insertion of the fluid sampling tube 36 into the duct work above or below the fan. During normal operation, the volume in the duct work below fan 20 experiences a reduction in pressure or a partial vacuum and the volume of the duct work above the fan experiences increased pressure.

As best indicated in FIG. 2, the end of U tube 32 that is in open communication with the atmosphere is indicated as U tube end 32A. The other end 32B of the U tube 32 is in open communication with the partial vacuum or suction created by operation of fan 20 via sampling tube 36. The partial vacuum created by the operation of fan 20 and communicated to end 32B of U tube 32 causes the fluid in the right side (32B at top) to rise and accordingly, the fluid level in the left side of U tube 30 near end 32A would fall. If there is a malfunction in the system, and fan 20 ceases to operate effectively, the partial vacuum or suction is removed from the right side of U tube 32 and the fluid level on the right side would drop causing the fluid on the left side of U tube 32 to rise so that the fluid level in both legs of the U tube are at the same level. As best illustrated in FIG. 1, tube end 32B is in communication with the duct work 14 just below fan 20 via tubing 36. Tubing 36 samples the degree of vacuum or reduction in air pressure, relative to atmospheric pressure, caused in duct 14 by operation of fan 20 and communicates the degree of partial vacuum to end 32 B of U tube 32.

As best illustrated in FIG. 2, detector 30 includes a light source 40 mounted on one side of tube 32 and a photodetector 50 mounted on an opposite side of U tube 32. Detector 30 also includes a digital signal forming circuit 54 and a driver circuit 56 which may be mounted on a circuit board 58 or other suitable structure. The digital signal output of driver circuit 56 via line 60 to control unit 22 on FIG. 1.

U tube 32 is made of a material that at least partially transmits light, that is it is at least translucent. Preferably, U tube 32 is made of a transparent material. Although the present invention may be utilized in other applications, the present application of the present invention is in connection with the use of a manometer in a radon remedial system as illustrated in FIGS. 1 and 2. The fluid used in manometer tube 32 may be mercury, but in many applications, including applications in radon remedial systems, a low viscosity petroleum based liquid is used to monitor the pressure or degree of vacuum conditions in the ducting of the radon remedial system. This low velocity petroleum based liquid used in the manometer is often not totally opaque to light. However, it does scatter light passing through and reduce the light or the intensity of the light being transmitted from the light source to the photodetector.

The light source utilized in practicing the present invention may be any suitable light source but preferably a light emitting diode is used. The light emitting diode and photodetector may be tuned to operate in the spectrum having wavelengths of about between 350 and 750 nanometers. Presently, it is preferred to operate at a wavelength of approximately 660 nanometers. In one embodiment of the present invention, a light emitting diode emitting red light was used with a wavelength of 640 nanometers with a plus/minus 20 degree half voltage beam width.

The photodetector may be any photodetector which responds to light with the wavelength of the light source used, but in a presently preferred embodiment, the photodetector may be an NPN phototransistor which is broadly tuned to be receptive to light having a wavelength in the range of from 500 to 800 nanometers and particularly with wavelengths in the range of 350 to 750V. The light source and the photodetector are positioned in line with each other across the diameter of the manometer. The maximum level of light is present at the phototransistor when there is no liquid in tube 32 between the light emitting diode and photodetector 50. The output of the photodetector is fed to a circuit which includes a digital signal forming circuit and a driver circuit. The photodetector may be a phototransistor, a photodiode or any other suitable photodetection device utilized to produce an output which varies in response to the amount of light intensity being received by the photodetector.

The circuit structure and operation of the digital signal forming circuit 54 and the driver circuit 56 may be described more particularly below with respect to FIG. 3. However, the digital signal forming circuit which receives the output of the photodetector is fed to a driver circuit which in turn supplies a digital switching circuit having a first and second well defined and stable states for indicating whether the radon remedial system is working properly to control unit 22. This signal is utilized to activate one or more audio and/or visual alarms 70 in a suitable living area or other desired location and/or to turn off the power to fan 20 and radon remedial system by means of control unit 22.

The circuit structure and operation of the digital signal forming circuit and the driver circuit will be now described with respect to FIG. 3. There is shown a light source in the form of a light emitting diode 40, L on one side of tube 32 at a predetermined location 34 and a photodetector 50, P mounted on the other side of tubes 32 at predetermined location 34. Light emitting diode 40 may be any suitable light source, but is preferably in a presently preferred embodiment a light emitting diode emitting red light at wavelength of 640 nanometers with a plus/minus 20 degree half voltage beam width.

Photodetector 50, P may be any suitable photodetection device which produces an output which varies with the intensity of the light impinging upon it from the light source, but in a presently preferred embodiment, the photodetector is an NPN phototransistor which is broadly tuned to a light wavelength in the range of from about 500 to about 800 nanometers. These are preferably positioned in line with each other across the diameter of manometer tube 32 at predetermined location 34, that is the location where a change in fluid level needs to be detected if there is a change in operation of the radon remedial system. The maximum level of light is present at phototransistor 50, P when there is no liquid between the light source 40 and the phototransistor 50. Under this condition, the phototransistor 50 output is typically a nominal voltage of about 0.2V DC. However, this may vary somewhat, perhaps as high as 0.4V DC depending upon the tuning and alignment between the light emitting diode and the light source. When the liquid rises so that it is in tube 32 at location 34 in the path between light source 40 and the photodetector 50, the beam of light is disbursed by the fluid in manometer tube 32 and the voltage at the output of photodetector 50 rises to a nominal level of 5V, in the specific example illustrated. It is understood that in connection with the description of FIG. 3 specifically and generally throughout, specific examples are given, and these are intended to be specific examples of presently preferred embodiments, and not limitations on the scope of the invention.

The DC biasing voltages are selected and applied to the light emitting diode and phototransistor to insure the output levels for the particular NPN phototransistor utilized herein. An unambiguous voltage signal as a function of the presence or absence of liquid in the LED-photodetector path must be transmitted to a remote location via line 60 and used in control unit 22 to turn off the power to the radon remedial system and to activate alarms 70 as may be desired. These may be audible and/or visual alarms. The output of the photodetector is normally an analog voltage which varies quasi-linearly and it is hard to use it as a digital alarm signal having a defined and stable and selectable trigger point. The output of photodetector, 50, P, which may be a phototransistor, does not provide a definite switch point. The two states, an on state and an off state or a high and a low state outputs are achieved from the analog voltage by driving a triggered NAND gate from the phototransistor 50 output. The NAND gate output rises to its supply voltage of Vcc when the phototransistor output is less than 0.6Vcc and drops to 0V when the input signal from the phototransistor is above 0.6 of Vcc. These two levels provide the desired output levels. These levels are supplied to drive Q which may be a common emitter PNP transistor which lowers the output impedance so that long cable runs can be driven. Again, values, voltages and other particulars are by way of specific example and not by way of limitation. It is understood that various other circuit components and biasing resistors and voltages may be utilized.

The digital signal forming circuit 54 may be a NAND logic gate with a positive feedback loop such that it is driven rapidly from one state to the other once the trigger point is reached. The trigger point of the integrated circuit NAND logic gate is high under normal operating conditions, that is with fan 20 running and the output of photodetector or phototransistor 50, P being typically 0.2 V and certainly less than the trigger point of NAND gate 54 which is 3.3 V. The output of NAND gate 54 is fed to the input of driver transistor Q which may be a PNP transistor which acts as a driver to provide an output levels signal at a low impedance.

It is understood that various solid state devices may be utilized for trigger NAND gate 54 and driver 56. For example, NAND gate 54 may be an integrated circuit NAND logic gate commercially available from Zitex as part number 74LVC1G00 or other suitable device such as one available from Fairchild Semiconductor as part number NC7ST00p5X. Alternatively, various other suitable semiconductor devices may be utilized both for the digital signal forming circuit and the driver.

The digital signal forming circuit receives the output of the photodetector. The digital signal forming circuit has an output which changes from one state to a second state when the output voltage of the photodetector reaches a predetermined voltage. The digital signal forming circuit includes predetermined supply voltages 80 and 82 and components 87, 88, 90 and 100 biasing at least one solid state device therein to switch states at the predetermined voltage. The predetermined voltage is selected to be within a range of output voltages of the photodetector. The rate of voltage difference change between the first and second states is significantly faster than the voltage variation of the output of the photodetector.

The driver circuit 56 has a low impedance output 62 across resistor R 10, identified as 100 in FIG. 3, which is supplied to line 60 to control unit 22 and the line 72 to the remote alarm 70 at a remote location or locations.

In operation, under normal operating conditions, the light emitting diode L focused on phototransistor P produces a voltage of approximately 0.2 volts. This voltage may be applied to the input of NAND gate 54, which as indicated above may be an integrated circuit logic circuit with positive feedback on its input. The output from the NAND gate is in the high state which biases off PNP transistor Q (56). The biasing off of driver transistor 56 results in substantially no current flow through R10 identified as 100 in FIG. 3 resulting in a very low voltage drop across that resistor and accordingly a very low output. This output is stable and is held low as long as the radon remedial system continues to operate effectively under normal operating conditions. The trigger point of NAND gate 54 is 3.3 volts. It is understood that other values and other components may be selected utilizing the concepts and principles of the present invention.

Under low vacuum conditions, that is where a faulty radon remedial system is not operating as effectively as it should be, the partial vacuum created in duct work 14 below fan 20 and the degree of vacuum in the right leg of U tube 32 decreases, (that is pressure increases), and the fluid level in the left tube of the manometer rises. Under this condition, the intensity of the light reaching detector P is reduced due to the rise in the fluid level within the left leg of manometer 32. The phototransistor voltage level rises inversely as the light intensity. When this voltage reaches 3.3V, the trigger voltage, the NAND gate switches on its output to the low state. This drives the emitter-base junction of Q into conduction and the emitter to collector voltage to a saturation voltage of 0.1V maximum. This voltage in turn sends 5.5V to the control unit 22 to turn off the fan 22 and to remote alarm 70.

The switch in the output level voltage across resistor 100 (R10) occurs very rapidly producing a rapid shift in the output from a substantially zero level or very low level voltage to 5.5V in what may be referred to as a square wave. In other words the shift occurs rapidly and goes from one stable level to another stable level which makes it suitable for controlling an emergency on/off switch and/or alarms or the absence of alarms as the case may be. Accordingly, in accordance with the present invention, a selectable (by selection of components and voltages), predictable and stable digital output is provided to control shut off and/or alarms as may be desired. Again, the values herein are used for illustration purposes only and it is understood that within the scope of the present invention, other voltages, values and components may be utilized to carry out the present invention.

As described previously, a time delay may be inserted in the system to allow time for fan 20 to create the partial vacuum in the duct work below it. In a presently preferred embodiment, a time delay 26 is instituted in control unit 22 to prevent shut off of the system before fan 20 develops sufficient suction. This time delay also may be inserted in the circuit of FIG. 3 in various ways and locations. For example, an RC time constant circuit may be inserted between the output of the photodetector and the input to the digital signal forming circuit such that until a capacitor charges up to 3.3V DC, digital signal forming circuit 54 would not go low and remains in the high state which biases off driver 56 keeping the low state signal (non alarm signal) from shutting off the radon remedial system or generating any alarms. Again it is understood that various other types of delay circuits and connection of them into the system may be utilized.

The present invention may be embodied in other specific forms without departing from the spirit or essential attributes thereof and, accordingly, reference should be made to the appended claims, rather than to the foregoing specification as indicating the scope of the invention.

We claim:

1. A detector for detecting a change in fluid level in a tube;
   said tube being constructed of a material that at least partially transmits light;
   a light source mounted on one side of said tube for emitting light and a photodetector mounted on an opposite side of said tube for receiving said light;
   said light and said photodetector being mounted at a first predetermined location along said tube proximate a location of fluid level change, said photodetector receiving a first input voltage and providing an output voltage when receiving said light, said output voltage of said photodetector varying with the intensity of light received;
   a NAND gate receiving a second input voltage, less than the first input voltage and said NAND gate further receiving said output voltage directly from said photodetector at multiple inputs of said NAND gate, said NAND gate having an output which changes from one state to a second state when said output voltage of said photodetector reaches a predetermined voltage, said NAND gate including predetermined supply voltages and components biasing at least one solid state device therein to switch between a first state and a second state at said predetermined voltage, said predetermined voltage being within a range of output voltages of said photodetector, the rate of voltage difference change between said first and said second states being significantly faster than the voltage variation rate of said output of said photodetector; and a driver circuit, said driver circuit having impedance output value suitable for matching impedance of a line to a remote location, said driver receiving said output of said NAND gate and providing a signal at the impedance output value for transmission to a remote location to indicate whether fluid in said tube is above or below said predetermined location.

2. A detector in accordance with claim 1 wherein said tube is a tube of a manometer.

3. A detector in accordance with claim 2 wherein said manometer measures pressure or degree of vacuum relative to atmospheric pressure in a radon remedial system.

4. A detector in accordance with claim 3 wherein said output of said NAND gate is applied to turn off power to said remedial system.

5. A detector in accordance with claim 4 including a time delay which enables the radon remedial system to become operational.

6. A detector in accordance with claim 5 wherein said time delay is provided by a resistance-capacitance time constant circuit wherein the time delay is generated by the time necessary to charge the capacitance to a predetermined value which triggers the detector into operation.

7. A detector in accordance with claim 5 wherein said time delay prevents the shut off of power for a predetermined period of time after start up.

8. A detector in accordance with claim 1 wherein said NAND gate provides a signal to a remote location to provide an audible and/or visual alarm.

9. A detector in accordance with claim 1 wherein said photodetector is a phototransistor.

10. A detector in accordance with claim 9 wherein said phototransistor is an NPN phototransistor which is tuned to frequencies corresponding to wavelengths from 500 to 800 nanometers.

11. A detector circuit in accordance with claim 10 wherein said light is a light emitting diode (LED) emitting red light with a wavelength of approximately 640 nanometers.

12. A detector in accordance with claim 1 wherein said light is a light emitting diode and said photodetector is a phototransistor operating with light having wavelengths of 350 to 750 nanometers.

13. A detector in accordance with claim 1 wherein said NAND gate utilizes positive feedback on said at least one solid state device to produce a faster change from said one state to said second state as compared to the rate of change of the output of said photodetector.

14. A detector in accordance with claim 1 wherein said light source emits light having a wavelength in the range of 350 to 750 nanometers and said photodetector is receptive to light having a wavelength in the range of 350 to 750 nanometers.

15. A detector in accordance with claim 1 wherein said light source emits light having a wavelength of 660 nanometers and said photodetector is receptive to broad light having a wavelength in the range of 500 to 800 nanometers.

16. The detector in accordance with claim 1, wherein the first input voltage is more than about 30 percent higher than the second input voltage.

17. The detector in accordance with claim 1, wherein the first input voltage is about 1.9 volts higher than the second input voltage.

18. The detector in accordance with claim 1, wherein the first input voltage is about 7.5 volts and the second input voltage is about 5.6 volts.

* * * * *